(12) United States Patent
Hoshino (10) Patent No.: US 7,650,613 B2
(45) Date of Patent: Jan. 19, 2010

(54) DISC DRIVE

(75) Inventor: Toru Hoshino, Gunma-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 456 days.

(21) Appl. No.: 11/504,590

(22) Filed: Aug. 16, 2006

(65) Prior Publication Data

US 2007/0044113 A1    Feb. 22, 2007

(30) Foreign Application Priority Data

Aug. 19, 2005    (JP)    ............... P2005-238228
Aug. 19, 2005    (JP)    ............... P2005-238231

(51) Int. Cl.
*G11B 17/04*    (2006.01)
*G11B 33/12*    (2006.01)
*G11B 33/02*    (2006.01)

(52) U.S. Cl. ..................... 720/624; 720/623

(58) Field of Classification Search .......... 720/617–626
See application file for complete search history.

(56) References Cited

FOREIGN PATENT DOCUMENTS

| JP | 60-194797 | | 12/1985 |
|---|---|---|---|
| JP | 61085692 A | * | 5/1986 |
| JP | 62-39294 | | 3/1987 |
| JP | 63191391 A | * | 8/1988 |
| JP | 2-72497 | | 6/1990 |
| JP | 07220461 A | * | 8/1995 |
| JP | 11-306831 | | 11/1999 |
| JP | 2000-285574 | | 10/2000 |
| JP | 2001-195810 | | 7/2001 |
| JP | 2003-016769 | | 1/2003 |
| JP | 2003-059157 | | 2/2003 |
| JP | 2003109279 A | * | 4/2003 |
| JP | 2005-044486 | | 2/2005 |
| JP | 2005166146 A | * | 6/2005 |
| JP | 2005166183 A | * | 6/2005 |

OTHER PUBLICATIONS

English-machine translation of JP 2003-109279 A to Kojima (JP 2003-109279 A), published on Apr. 11, 2003.*

* cited by examiner

*Primary Examiner*—William J Klimowicz
(74) *Attorney, Agent, or Firm*—The Nath Law Group; Jerald L. Meyer; Jonathan A. Kidney (57) ABSTRACT

A disc drive comprises an enclosure, a disc carrying unit, a pair of rotating members, and a pair of light sources. The enclosure has an opening for insertion and ejection of the disc. The disc carrying unit carries a disc having been inserted into the opening to the inside of the enclosure and ejects the disc having been carried into the inside of the enclosure from the opening. Each of the rotating members has a disc contact portion in contact with the end face of the disc and moves the disc contact portion in the state where the disc contact portion is in contact with the end face of the disc when the disc carrying unit carries the disc. Each of the light sources is provided at the disc contact portion and has light enter the inside of the disc from the end face of the disc.

5 Claims, 7 Drawing Sheets

DISC DRIVE

BACKGROUND OF THE INVENTION

1. Field of the Invention

The present invention relates to a disc drive used for recording image or musical tune information in a disc (an optical disc or a magneto optical disc having optical transparency) and playing the recorded information, and more specifically to a slot-in type disc drive in which a disc emits light at insertion or ejection of the disc so that an excellent illumination effect can be exerted.

2. Description of the Related Art

Disc drives include one type in which a disc is loaded on a tray and carried into the disc drive and another type in which a tray is not provided but a disc is carried into the disc drive through a slit-like opening (slot) provided on the front face of an enclosure of the disc drive. The disc drive in which a disc is directly inserted into the opening is referred to as a slot-in type.

In the slot-in type disc drive, various types of provision of a light emitting body in the disc drive are proposed in order to improve visibility in a dark place or to provide an illumination effect. In the disc drive provided with a tray on which a disc is loaded, light emission of the tray is disclosed in Japanese Utility Model Laid-Open No. S60(1985)-194797. Also, light emission in the vicinity of the opening in the slot-in type disc drive is disclosed in Japanese Utility Model Laid-Open No. H02(1990)-072497.

The slot-in type disc drive with light emission in the vicinity of the opening has an effect that the position of the opening into which the disc is to be inserted is made clear even in a dark place. However, since the disc itself does not emit light, the illumination effect is poor. Thus, a disc drive with excellent visibility and illumination effect in a dark place is in demand in the slot-in type disc drive.

SUMMARY OF THE INVENTION

The present invention has an object to provide a slot-in type disc drive in which a disc is inserted into and ejected from the drive through a slit-like opening without using a tray, which is excellent in visibility and illumination effect in a dark place.

In order to achieve the above object, the present invention provides a disc drive configured to drive a disc (D) comprising an enclosure (1) in which an opening (3) for insertion and ejection of the disc is formed, a disc carrying unit (7) configured to carry the disc having been inserted into the opening to an inside of the enclosure and eject the disc having been carried into the inside of the enclosure from the opening, a moving member (10, 20) configured to have a disc contact portion (12) in contact with an end face of the disc and move the disc contact portion in the state where the disc contact portion is in contact with the end face of the disc when the disc carrying unit carries the disc, and a light source (16) provided at the disc contact portion and configured to emit light from the end face of the disc into the inside of the disc.

It is preferable that the moving member is a rotating member (10, 20) configured to rotate around a predetermined position when the disc carrying unit carries the disc.

The rotating member may be a detecting member (20) configured to detect that the disc has been inserted into the opening.

It is preferable that the disc drive further comprises a locking portion (C) configured to separate the disc contact portion from the end face of the disc and lock the moving member at a separate position when the disc is carried to a carrying completion position inside the enclosure by the disc carrying unit.

It is preferable that the disc contact portion comprises a first disc contact portion and a second disc contact portion provided at positions separated from each other, a first light source is provided at the first disc contact portion, a second light source is provided at the second disc contact portion. And when the moving member is in an initial state before the disc is inserted into the opening, an interval between the first light source and the second light source in the direction crossing the disc carrying direction is preferably 15 mm or more.

It is preferable that the first light source and the second light source are arranged so that they are located on the both sides of the center line of the disc extending in the direction in parallel with the disc carrying direction, and a distance from the center line to the first light source or the second light source in the direction crossing the center line is set within a range from 10 mm to 30 mm.

In order to achieve the above object, the present invention provides a disc drive configured to drive the disc (D) comprising the enclosure (1) in which the opening (3) for inserting and ejecting the disc is formed, the disc carrying unit (7) configured to carry the disc having been inserted into the opening into an inside of the enclosure and eject the disc having been carried into the inside of the enclosure from the opening, and a light source (30) fixed in the vicinity of the both ends of the opening in the longitudinal direction inside the enclosure, provided at positions opposite to the end face of the disc to be carried by the disc carrying unit, and configured to have light enter the inside of the disc from the end face of the disc.

It is preferable that a light guide member configured to collect light emitted from the light source at the end face of the disc between the light source and the end face of the disc.

It is preferable that the light guide member separates the light emitted from the light source to a first light heading toward the end face of the disc and a second light heading toward the both ends of the opening in the longitudinal direction.

DESCRIPTION OF THE PREFERRED EMBODIMENTS

First Embodiment

Figure 1:
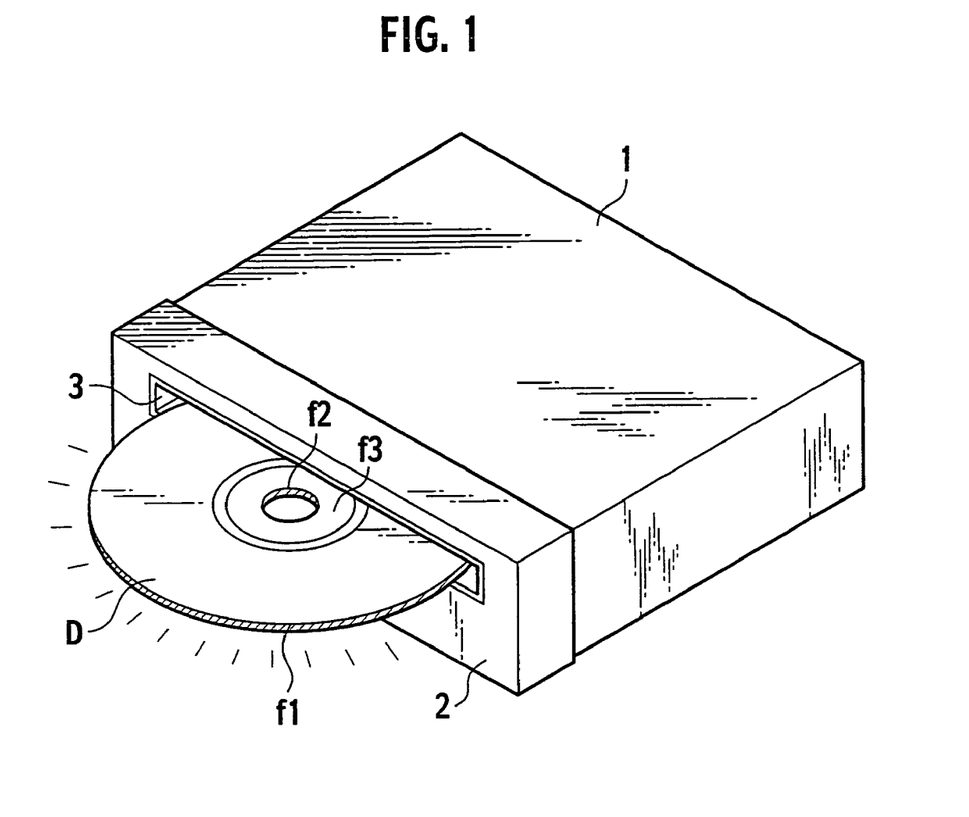
FIG. 1 is a perspective view of a disc drive according to first to third embodiments of the present invention.

Hereinafter, with reference to FIGS. 1 to 7, a slot-in type disc drive according to the first embodiment of the present invention will be described below in detail. FIG. 1 is a perspective view of a disc drive according to the first embodiment of the present invention. As shown in FIG. 1, an enclosure 1 forms an exterior of the disc drive and has an operation face 2 on the front face of the enclosure 1. The operation face 2 includes operation switches thereon. Also, the operation face 2 includes a slit-like opening (slot) 3 for insertion/ejection of a disc D (optical disc or magneto optical disc) having light transparency thereon. In this embodiment, the disc D is an optical disc such as CD (compact disc) or DVD (digital versatile disc).

A flap plate (not shown) for preventing intrusion of dusts may be provided at the opening 3 and the opening 3 may be capable of opening/closing. In this case, the flap plate is preferably formed by a transparent material. Thereby, even if the opening 3 is closed by the flap plate, radiation light of a light source, which will be described later, leaks out of the opening 3 to improve visibility of the opening 3.

In FIG. 1, a hatched outer circumferential end face f1 and an inner circumferential end face f2 as well as a transparent portion f3 around a center hole of the disc D constitute a main light emitting portion of the disc D as will be described in detail later.

Figure 2:
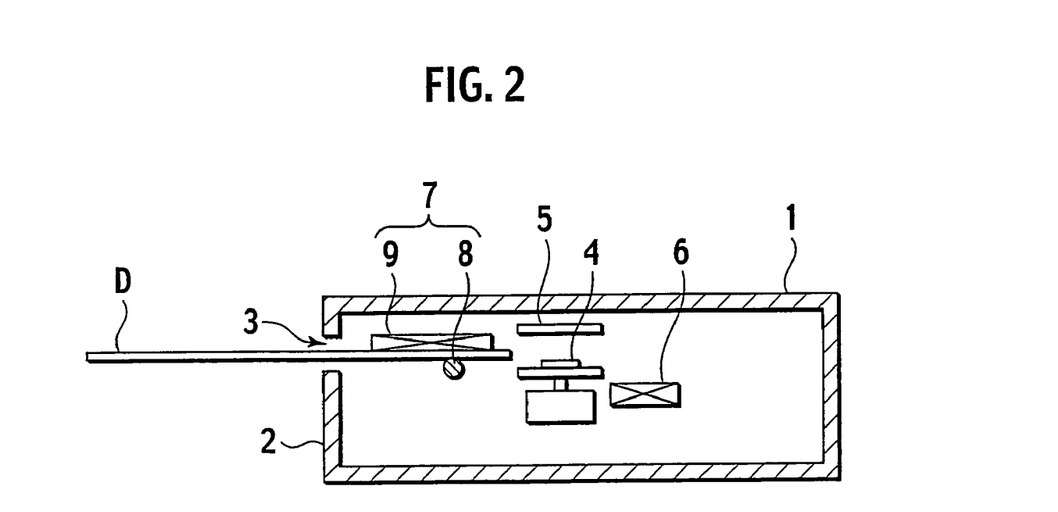
FIG. 2 is a plan view schematically showing the internal structure of the disc drive according to the first to the third embodiments of the present invention when seen from the side face.

FIG. 2 is a schematic plan view showing the internal structure of the disc drive according to the first embodiment of the present invention. As shown in FIG. 2, a drive unit is provided with a turntable 4 for turning the disc, a clamp disc 5 for chucking the center portion of the disc D in cooperation with the turntable 4, a pickup 6 for detecting a pit row of the disc, and a chassis (not shown), to drive the disc D for recording/playing. The turntable 4, the clamp disc 5 and the pickup 6 are integrally assembled to the chassis. The disc D is chucked by the turntable 4 and the clamp disc 5 at the center portion thereof and rotated in one direction. In that state, the pickup 6 is moved in the radial direction of the disc D along the disc face of the disc D.

A disc carrying unit 7 comprises a feed roller 8 and a fixed plate 9 provided inside the enclosure 1 for carrying the disc D between the opening 3 and the turntable 4. The disc carrying unit 7 may be constituted by using a pair of feed rollers holding the disc D between them.

The feed roller 8 is rotated forward/backward by a driving source (not shown) and provided at the enclosure 1 in parallel with the longitudinal direction of the opening 3 and in the state urged by a spring toward the fixed plate 9, movably in the vertical direction thereof (rotating shaft direction of the turntable 4).

The fixed plate 9 is a flat plate-like member formed from a synthetic resin and provided higher than the opening 3 in the enclosure 1 so as to be opposed to the feed roller 8. The face of the fixed plate 9 opposite to the feed roller 8 is given fluororesin processing. Thereby, the opposite face of the fixed plate 9 becomes a smooth surface with a small frictional force, and damage on the disc D in slide contact with the fixed plate 9 can be prevented.

The disc carrying unit 7 holds the disc D inserted into the opening 3 between the feed roller 8 and the fixed plate 9, rotates the feed roller 8 forward and carries it onto the turntable 4 while bringing the held disc D into slide contact with the fixed plate 9. When the center potion of the disc D is overlapped with the center portion of the turntable 4, the disc carrying unit 7 lowers the feed roller 8 to separate the feed roller 8 from the disc D. The fixed plate 9 has a detector for detecting insertion of the disc D (e.g. photo sensor: not shown). When the detector detects the insertion of the disc D, the feed roller 8 is rotated forward.

At ejection of the disc D, the disc carrying unit 7 raises the feed roller 8, holds the disc D between the feed roller 8 and the fixed plate 9, drives the feed roller 8 backward and carries the held disc D in sliding contact with the fixed plate 9 to the opening 3.

In the carrying-out operation of the disc D by the disc carrying unit 7, the disc carrying unit 7 holds a part of the disc D between the feed roller 8 and the fixed plate 9 and ejects the disc D about a half of the entire disc D from the opening 3 to the outside of the enclosure 1. Thereby, a user can easily pull out the disc D and after the disc D is pulled out from the opening 3, another disc D can be inserted into the opening 3.

Figure 3:
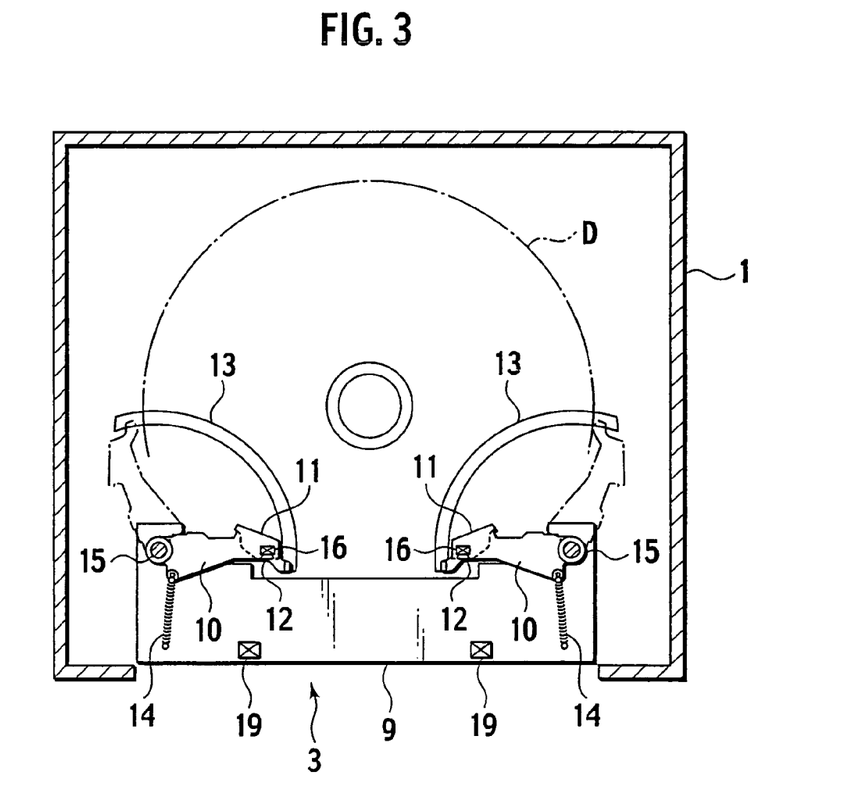
FIG. 3 is a plan view schematically showing the internal structure of the disc drive according to the first embodiment of the present invention when seen from the upper face.

FIG. 3 is a schematic plan view showing the internal structure of the disc drive according to the first embodiment of the present invention. As shown in FIG. 3, the disc drive further comprises a right and left pair of rotating members (lever) 10, 10 for opening/closing a carrying path of the disc. The pair of rotating members 10, 10 are located in the vicinity of the opening 3 in the enclosure 1 and rotatably mounted to the fixed plate 9 on the both sides of the carrying path of the disc D. The tip end portions of the rotating members 10, 10 are formed as projection portions 11, 11 extending into the carrying path of the disc D. The end face portions of the projection portions 11, 11 become disc contact portions 12, 12 brought into contact with the end face of the disc D at insertion of the disc D into the opening 3 or ejection of the disc D from the opening 3.

Figure 4:
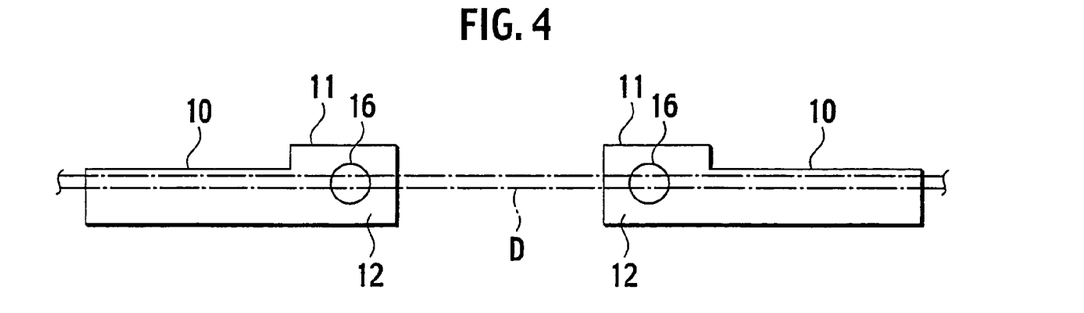
FIG. 4 is a plan view for explaining the disc drive according to the first embodiment of the present invention.

Light sources 16, 16 are provided in the projection portions 11, 11 forming the disc contact portions 12, 12 of the pair of rotating members 10, 10. The light source 16 is a light emitting diode (LED) of a chip type, for example, and it is preferable to be a multicolor LED which can emit various light colors through composition of red, green and blue lights. The light source 16 may be a two-color LED of red and green or a single-color LED instead of the multicolor LED. As shown in FIG. 4, in the state where the disc contact portion 12 is brought into contact with the end face of the disc D, the light source 16 is arranged opposite to the end face of the disc D. By this arrangement, the light emitted from the light source 16 enters inside of the disc D from the end face of the disc D.

As shown in FIG. 3, the disc drive further comprises arc-like guide plates 13, 13 for guiding rotation of the rotating members 10, 10 and springs 14, 14 urging the rotating members 10, 10 toward the opening 3. The springs 14, 14 are fastened by the rotating members 10, 10 and the fixed plates 9, 9 at the both ends of the springs 14, 14.

Each of the rotating members 10, 10 is at a solid line position shown in FIG. 3 by an elastic force of the spring 14 to block the carrying path of the disc D, before the disc D is inserted into the opening 3. When the disc D is inserted into the opening 3, the end face of the disc D presses a part of the rotating members 10, 10 (disc contact portions 12, 12). In this state, the rotating members 10, 10 are rotated around node points 15, 15 of the fixed plates 9, 9 and the rotating members 10, 10 toward the depth of the opening 3 so as to gradually open the carrying path of the disc D. That is, by the disc D, the interval between the disc contact portions 12, 12 are widened, thereby passage of the disc D through the rotating members 10, 10 is allowed.

When the disc D is inserted into the opening 3 and carried to a predetermined position by the disc carrying unit 7, the rotating members 10, 10 are locked by a locking portion, which will be described later. Thereby, as shown by a virtual line in FIG. 3, the disc contact portions 12, 12 are held in the state separated from the end face of the disc D. When the disc contact portions 12, 12 are separated from the end face of the disc D, the drive unit can rotate the disc D.

Before the disc D is inserted into the opening 3, since the light emitted from the light sources 16, 16 illuminates the opening 3 from the inside, the user can easily recognize the position of the opening 3 in which the disc D is to be inserted even if the disc drive is placed in a dark place. Also, with improvement of visibility, the disc drive can exert an excellent illumination effect by the light emitted from the light sources 16, 16.

Figure 5:
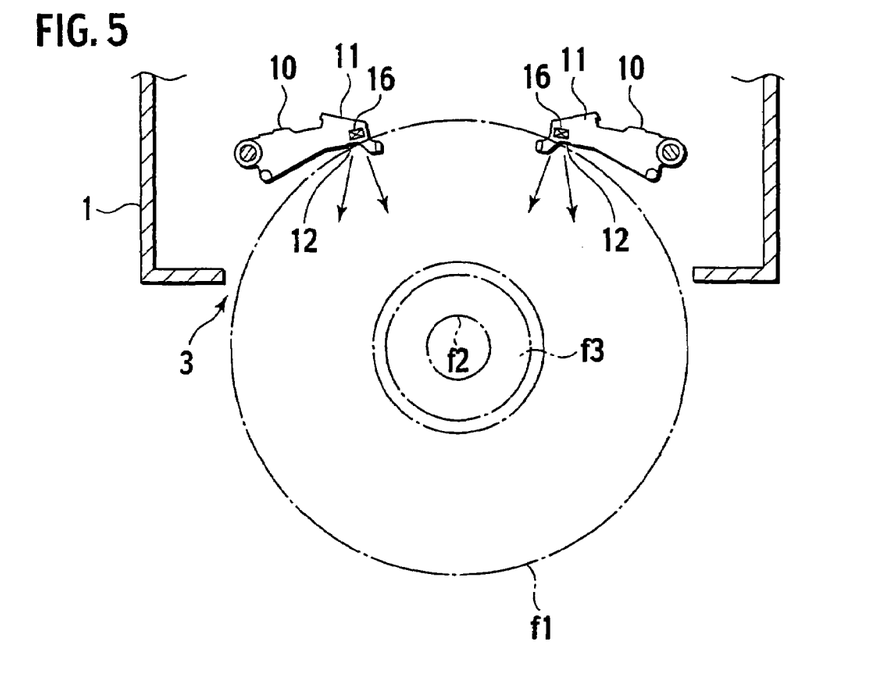
FIG. 5 is a plan view for explaining action at insertion or ejection of a disc in the disc drive according to the first embodiment of the present invention.

And when the disc D is inserted into the opening 3 and touches the disc contact portions 12, 12, as shown in FIG. 5, the light emitted from the light sources 16, 16 enters the inside of the disc D from the end face of the disc D. The light having entered the inside of the disc D repeats reflection between the inner circumferential edge and the outer circumferential edge of the disc D, and the light is guided to an outer circumferential end face f1 (external exposed end) of the disc D. Until the disc D is carried by the turntable 4 and the clamp disc 5 to a chucking position, the disc contact portions 12, 12 are kept in contact with the end face of the disc D. Therefore, in the carrying path of the disc D, the light emitted from the light sources 16, 16 enters the inside of the disc D from the end face of the disc D and has the disc D itself emit light.

Thus, a transparent portion of the disc D not covered by a light-blocking protective film, particularly an outer circumferential end face f1, an inner circumferential end face f2 and a transparent portion f3 around the center hole of the disc D emit light with high brightness at insertion of the disc D into the opening 3 or ejection of the disc D from the opening 3. As a result, the disc drive can exert an excellent illumination effect. Also, at ejection of the disc D, the light emission of the disc D exposed from the opening 3 improves visibility of the disc D and clarifies the position of the disc D even in a dark place. Thus, the user can easily withdraw the disc D. When the multicolor LED is used as the light source 16, by performing light-color conversion control and cyclically changing the emission color of the disc D, the illumination effect of the disc drive can be further improved.

Figure 6:
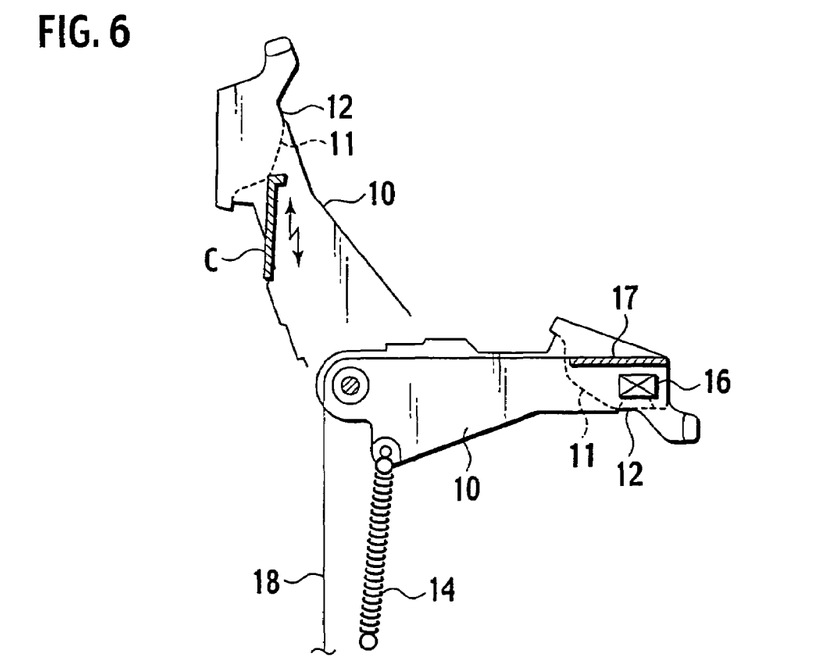
FIG. 6 is an enlarged view for explaining a rotating member in the first embodiment of the present invention.

As shown in FIG. 6, the disc drive further comprises boards 17, 17 conductively connected to the light sources 16, 16 and cams C, C constituting the locking portion. The boards 17, 17 are fixed to the rotating members 10, 10 on the back face side of the light sources 16, 16. The boards 17, 17 are conductively connected to connectors 19, 19 (See FIG. 3) arranged at the fixed plate 9 through signal lines 18, 18 with flexibility (e.g. FPC: Flexible Print Wiring).

The cam C is an L-shaped small piece formed by an existing movable part such as a traverse mechanism for moving a pickup 6 in the radial direction of the disc D. The cams C, C are moved in the carrying direction of the disc D (arrow direction in FIG. 6) in conjunction with the carrying operation of the disc D by the disc carrying units 7, 7. When the disc D reaches the turntable 4 and the clamp disc 5, which is the carrying completion position, the cams C, C are moved to a position to be engaged with the rotating members 10, 10, separates the disc contact portions 12, 12 from the end face of the disc D, and regulates rotational movement of the rotating members 10, 10 toward the opening 3 by an urging force of the springs 14, 14.

The projection portion 11 of the rotating member 10 is made as a cam follower to be engaged with the cam C. At carrying out of the disc D by the disc carrying unit 7, the engagement between the projection portions 11, 11 and the cams C, C is disengaged, and the disc contact portion 12 is brought into contact with the end face of the disc again. Therefore, when the disc D is inserted into the opening 3 or ejected from the opening 3, the disc D also emits light by the light emitted from the light source 16.

In the disc drive constructed as above, an interval between the light sources 16, 16 and a positional relation between each of the light sources 16 and the disc D in the initial state when the rotating members 10, 10 are not rotated before the disc is inserted into the opening 3 (See the solid line in FIG. 3) are preferably set as follows.

Figure 7:
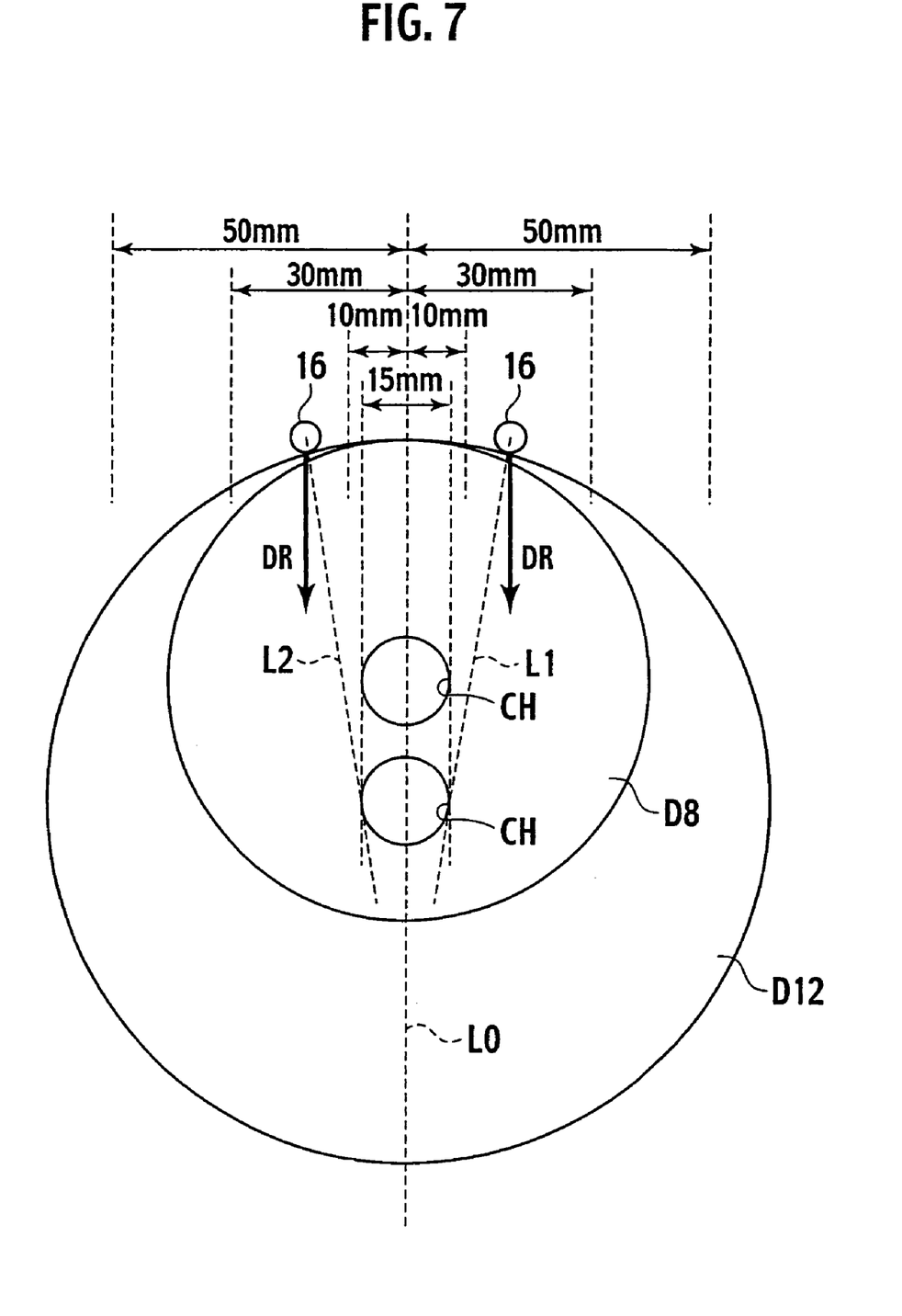
FIG. 7 is a view for explaining a preferred configuration of the disc drive according to the first embodiment of the present invention.

Into the disc drive, a disc D12 with a diameter of 12 cm or a disc D8 with a diameter of 8 cm is inserted as the disc D. First, a preferred embodiment when only the disc D 12 is to be inserted into the opening 3 will be described. As shown in FIG. 7, the light sources 16, 16 are arranged in symmetry with respect to a center line L0 of the discs D8, D12 in the width direction. The center line L0 is in parallel with the carrying direction of the discs D8, D12. Since a center hole CH of the disc D12 has a diameter of 15 mm, the interval between the light sources 16, 16 is preferably 15 mm or more and more preferably 20 mm or more. According to experiments by the inventor, it was found out that the illumination effect in the disc D12 is hard to be exerted if the light source 16 is arranged at a position exceeding 50 mm from the center line L0. Therefore, each light source 16 is preferably provided within a range from 7.5 mm to 50 mm from the center line L0 in the direction crossing the center line L0 and more preferably within a range from 10 mm to 50 mm.

If it is the disc drive exclusive for the disc D 12 with the diameter of 12 cm, the light sources 16, 16 may be provided within the above range. However, considering that the disc D8 with the diameter of 8 cm is inserted into the opening 3, the following arrangement is more preferable. Since the center hole CH of the disc D8 also has the diameter of 15 mm, the interval between the light sources 16, 16 is preferably 15 mm or more and more preferably 20 mm or more. According to experiments by the inventor, it was found out that the illumination effect in the disc D8 is hard to be exerted if the light source 16 is arranged at a position exceeding 30 mm from the center line L0. Therefore, each light source 16 is preferably provided within a range from 7.5 mm to 30 mm from the center line L0 in the direction crossing the center line L0 and more preferably within a range from 10 mm to 30 mm.

As shown in FIG. 7, when tangents connecting the light sources 16, 16 to the end of the center hole CH of the disc D12 (inner circumferential end face f2) are set as L1, L2, respectively, the emitting direction (arrow DR) of the light emitted from the light source 16 is preferably faced to the outer circumference side rather than the inner circumference side of the discs D8, D12 surrounded by the tangents L1, L2. By this arrangement, even if the disc D8 with the diameter of 8 cm is to be inserted into the opening 3, the emitting direction of the light emitted from the light source 16 is not headed into the center hole CH of the disc D8. In FIG. 7, the light emitting direction is in parallel with the carrying direction of the discs D8, D12 (center line L0). The light emitting direction may be directed toward the outer circumference side rather than the state parallel with the carrying direction of the discs D8, D12. Also, if the light from the light sources 16, 16 is a diffusion light having a predetermined sectional area, the light emitting direction is defined as a direction where the light at the center in the diffusion light is directed in this embodiment.

This embodiment is constructed such that the rotating members 10, 10 are provided on both sides of the carrying path of the disc D and the light sources 16, 16 are provided at the rotating members 10, 10, respectively. However, it may be so constructed that one light source 16 is provided at either one of the rotating members 10, 10 only. Or, one rotating member 10 may be provided only one side of the carrying path of the disc D. However, the construction that the light sources 16, 16 are provided at the rotating members 10, 10, respectively is more preferable than the construction to provide one light source 16 at one of the rotating members 10, 10 in terms of light emission of the disc D. Thus, it is preferable that the two light sources 16, 16 are provided at positions separated from each other.

Also, in this embodiment, when the disc D is carried by the disc carrying unit 7, the rotating members 10, 10 are used for moving the disc contact portions 12, 12 (and the light sources 16, 16) along with the disc D in the state where the disc contact portions 12, 12 are in contact with the end face of the disc. However, the construction that the disc contact portions 12, 12 (and the light sources 16, 16) are moved along with the disc D is not limited to this, but the disc contact portions 12, 12 (and the light sources 16, 16) may be provided at a member making a parallel movement in the carrying direction of the disc D, for example. Since the construction can be simplified in the rotational movement mechanism such as the rotating members 10, 10, it is preferable to use the rotating members 10, 10. The rotating member 10 is a preferred example of a moving member for moving the disc contact portion 12 (and the light source 16) along with the disc D.

Second Embodiment

Figure 8:
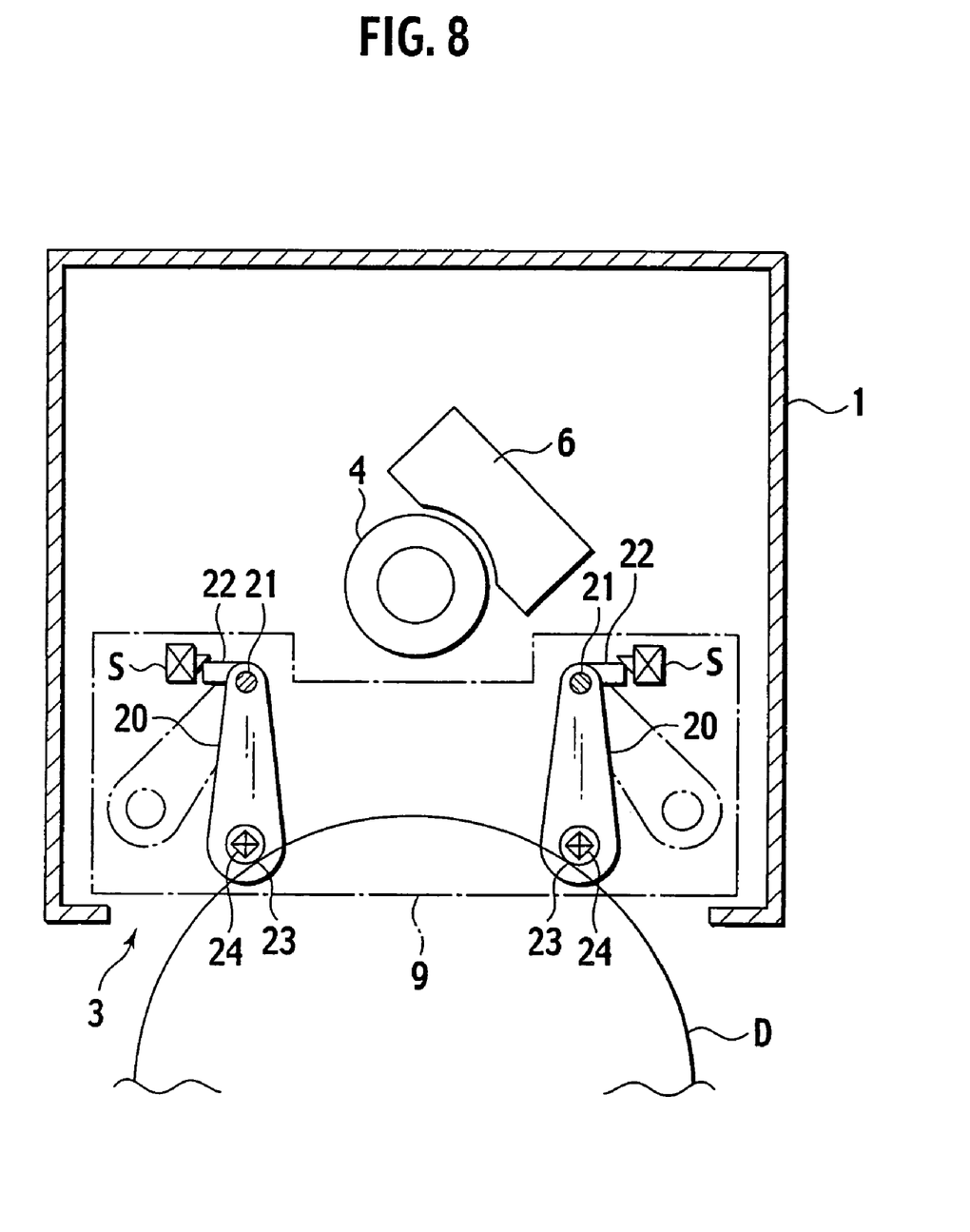
FIG. 8 is a plan view schematically showing the internal structure of the disc drive according to the second embodiment of the present invention when seen from the upper face.
Figure 9A:
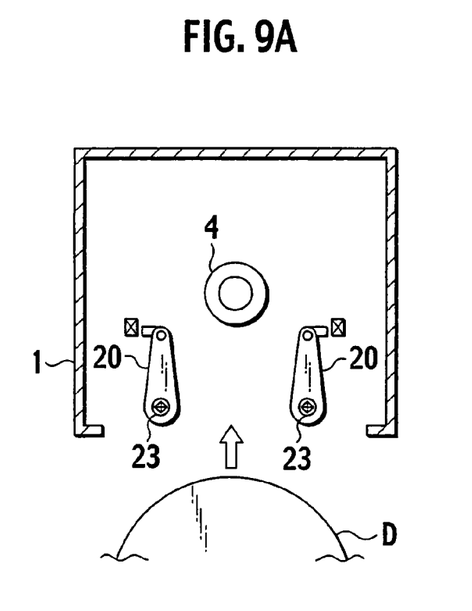
FIGS. 9A to 9D are views for explaining an operation of the disc drive according to the second embodiment of the present invention.
Figure 9B:
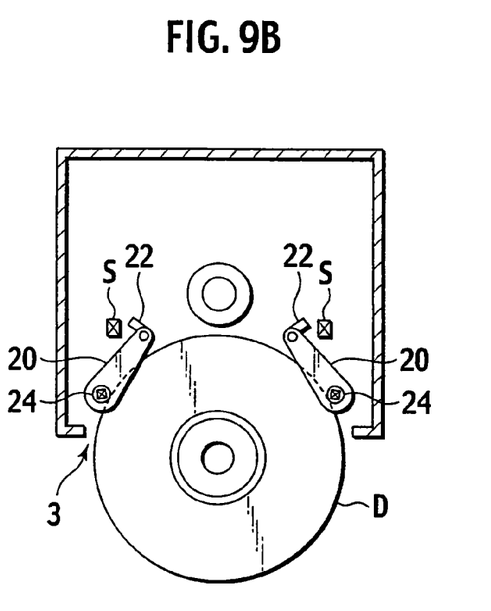

Next, referring to FIGS. 8 to 9D, a slot-in type disc drive according to the second embodiment of the present invention will be described in detail. In FIGS. 8 to 9D, the same portions as those in the first embodiment are given the same reference numerals and the description will be omitted as appropriate. In this embodiment, light sources 24, 24 are provided at rotating members 20, 20, which are detecting members for detecting that the disc D has been inserted into the opening 3, and the light from the light sources 24, 24 are made to enter the disc D from the end face of the disc D to have the disc D emit light.

As shown in FIG. 8, the rotating members 20, 20 are located in the vicinity of the opening 3 in the enclosure 1 and rotatably mounted to the fixed plate 9 on the both sides of the carrying path of the disc D. At one ends of node points 21, 21 forming the rotational movement center of the rotating members 20, 20, projecting pieces 22, 22 are formed, respectively, in correspondence with detectors S, S. The detector S is a contact-type switch such as a micro switch and mounted at the fixed plate 9 adjacent to one end of the node point 21 of the rotating member 20.

When the disc D is inserted into the opening 3 and the rotating members 20 are rotated, switching operation of the detectors S is performed by the projection pieces 21. Thereby, the feed roller 8 of the disc carrying unit 7 (See FIG. 2) is forwardly driven. At the tip ends of the rotating members 20, 20, pins 23, 23 are projected. The pins 23, 23 penetrate the fixed plate 9 and are suspended in the carrying path of the disc D. When the pins 23, 23 are pressed by the end face of the disc D, the rotating members 20, 20 are rotated.

The pins 23, 23 are regarded as the disc contact portions to be in contact with the end face of the disc D at insertion of the disc D into the opening 3 or ejection of the disc D from the opening 3. In the fixed plate 9, arc-like guide grooves (not shown) are formed to allow movement of the pins 23, 23.

At the rotating members 20, 20, the light sources 24, 24 are provided for having the light enter the disc D from the end face of the disc D in contact with the pins 23, 23. By the light emitted from the light sources 24, 24 and having entered the inside of the disc D, the disc D emits light at insertion of the disc D into the opening 3 or ejection of the disc D from the opening 3.

In this embodiment, the pin 23 is formed by a light transmitting material such as a transparent resin. In addition, the light source 24 is embedded in the pin 23, which may be formed by a non-light transmitting material, and arranged inside the pin 23 having a window for light emission or may be provided at a position adjacent to the pin 23.

Next, action of the disc drive will be described referring to FIGS. 9A to 9D. FIG. 9A shows a state before the disc D is inserted into the opening 3. At this time, the rotating members 20, 20 are held such that the interval between the pins 23, 23 becomes smaller than the diameter of the disc D by action of the spring (not shown).

When the disc D is inserted into the opening 3, the rotating members 20, 20 are widened by the disc D (See FIG. 9B), whereby the switching operation of the detectors S is performed by the projecting pieces 22. By the switching operation, the detector S detects that the projecting piece 22 is separated from the detector S. When the switching operation is carried out, the feed roller 8 of the disc carrying unit 7 is driven to start carrying the disc D into the enclosure 1.

Also, when the disc D is inserted into the opening 3, the light from the light sources 24, 24 enters the inside of the disc D from the end face of the disc D, repeats reflection between the inner circumferential edge and the outer circumferential edge of the disc D, and is guided to the outer circumferential end face f1 of the disc D (external exposed end). Therefore, the disc D is withdrawn into the enclosure 1 while emitting light.

Figure 9C:
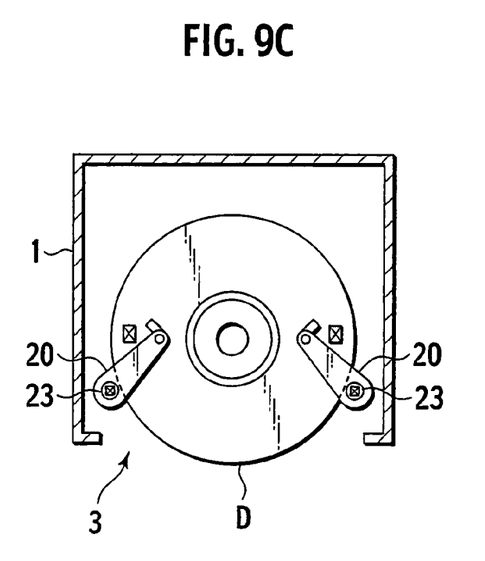
Figure 9D:
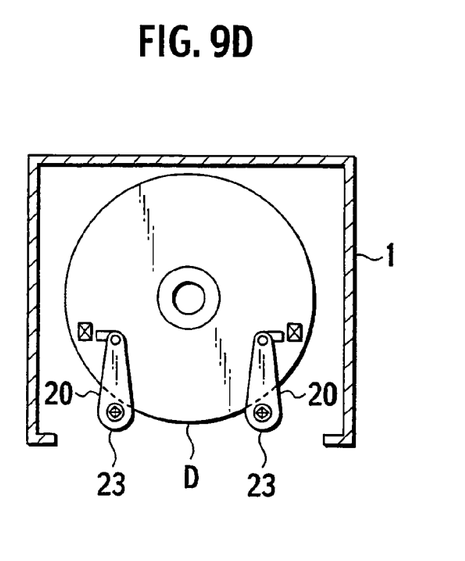

Then, the disc D enters the enclosure 1 while widening the rotating members 20, 20, and when the center portion of the disc D passes between the pins 23, 23, the rotating members 20, 20 start rotating gradually in the closing direction along the outer circumference of the disc D while the pins 23, 23 are in contact with the end face of the disc D by the action of the spring (See FIG. 9C). When the center of the disc D is guided onto the turntable 4, the rotating members 20, 20 are returned to the initial position, and the pins 23, 23 are separated from the end face of the disc D (See FIG. 9D).

Also when the disc D housed in the enclosure 1 is to be carried out toward the opening 3 by the disc carrying unit 7, the pins 23, 23 are pressed by the disc D moving from inside the enclosure 1 toward the opening 3, whereby the rotating members 20, 20 are widened. And when the light from the light source 24 enters inside of the disc D from the end face of the disc D, the disc D emits light. The disc D is ejected from the opening 3 to the outside the enclosure 1 while emitting light and brought into the state waiting for withdrawal by the user.

Therefore, in the disc drive of this embodiment, too, since the position of the opening 3 is made clear by the light from the light source 24 leaking from the opening 3 before the insertion of the disc D into the opening 3, the user can insert the disc D into the opening 3 easily even in a dark place. Also, since the disc D emits light with high brightness when the disc D is inserted into the opening 3 or ejected from the opening 3, the disc drive exerts the excellent illumination effect. When the disc D is ejected from the opening 3, since visibility of the disc D is improved, the user can easily withdraw the disc D.

In this embodiment, since the light sources 24, 24 are used as the detecting members for detecting that the disc D has been inserted, an exclusive mechanism for moving the light sources 16, 16 along with the disc D is not needed as in the first embodiment. Thus, the disc drive can be constructed inexpensively.

In this embodiment, the rotating members 20, 20 for detecting insertion of the disc D are provided on both sides of the carrying path of the disc D and the light sources 24, 24 are provided at the rotating members 20, 20, respectively, but it may be so constructed that one light source 24 is provided at either one of the rotating members 20, 20 only. Alternatively, one rotating member 20 may be provided only at either one side of the carrying path of the disc D. However, the construction that the rotating members 20, 20 are provided at the light sources 24, 24, respectively, is more preferable than the construction that one light source 24 is provided at one of the rotating members 20 in terms of insertion detection of the disc D and light emission of the disc D. Thus, it is preferable to provide the two light sources 24, 24 at positions separated from each other.

In this embodiment, too, the interval between the light sources 24, 24 and the positional relation between the light sources 24, 24 and the center line L0 of the disc D in the width direction is preferably within the range described in FIG. 7.

Third Embodiment

Figure 10:
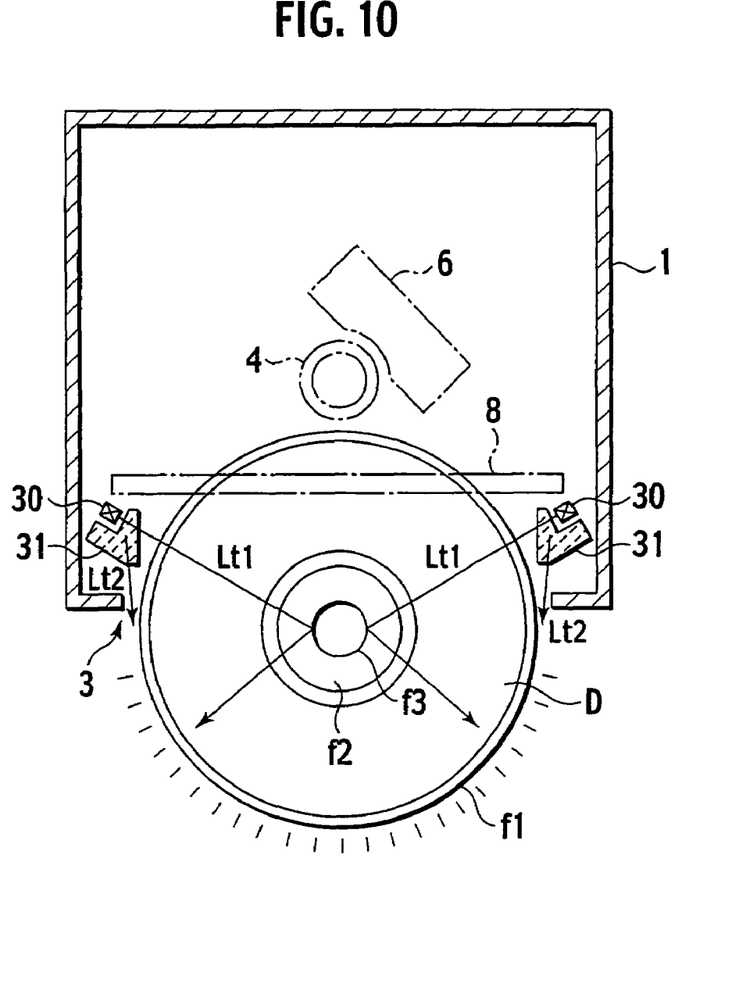
FIG. 10 is a plan view schematically showing the internal structure of the disc drive according to the third embodiment of the present invention when seen from the upper face.
Figure 11:
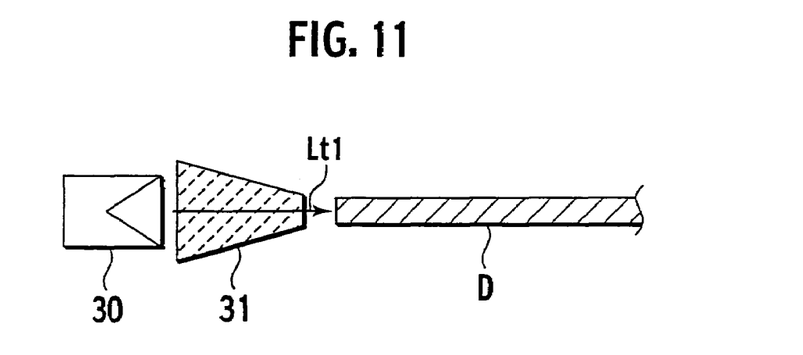
FIG. 11 is a view for explaining a preferred configuration of the disc drive according to the third embodiment of the present invention.

Next, a slot-in type disc drive according to the third embodiment of the present invention will be described in detail referring to FIGS. 10 and 11. In FIGS. 10 and 11, the same reference numerals are given to the same portions as those in the first embodiment, and the description will be omitted as appropriate. In this embodiment, the light sources 16, 24 moving at carrying of the disc D are not provided at the rotating members 10, 20 as in the first and the second embodiments, but a light source 30 is fixed in the enclosure 1.

FIG. 10 is a schematic plan view showing a state where the disc D is inserted into the opening 3 or ejected from the opening 3. As shown in FIG. 10, the light sources 30, 30 are provided, respectively, in the vicinity of the both ends of the opening 3 in the enclosure 1 in the longitudinal direction. The light sources 30, 30 are fixed at positions opposed to the end face of the disc D, respectively, when the disc D is inserted into the opening 3 or ejected from the opening 3. The disc D emits light by the light emitted from the light sources 30, 30. The term that "the light source 30 opposed to the end face of the disc D" used in this embodiment means not only that the light source 30 is directly opposed to the end face of the disc D but also that another member is arranged between the light source 30 and the end face of the disc D and the light source 30 is indirectly opposed to the end face of the disc D. That is, the positions in the height direction of the light source 30 and the end face of the disc D (positions in the direction crossing the face of the disc D) substantially match each other.

In the vicinity of the light sources 30, 30, light guide members 31, 31 (e.g. prisms) are provided for intensively guiding light emitted from the light sources 30, 30 to the end face of the disc D. The light guide member 31 may be brought close to the light source 30 to be integrated with the light source 30. The light guide members 31, 31 collect the light emitted from the light sources 30, 30 and also preferably split light to lights Lt1, Lt1 heading in the direction of the disc D and lights Lt2, Lt2 heading toward the both ends of the opening 3 in the longitudinal direction. By this, the light emitted from the light sources 30, 30 advances into the disc D from the end face of the disc D to have the outer circumferential end face f1, the inner circumferential end face f2 and the transparent portion f3 around the center hole of the disc D emit light and leaks out from the gap between the opening 3 and the disc D.

As shown in FIG. 11, the light guide member 31 is preferably in the tapered shape whose thickness is gradually decreased from the light source 30 toward the end face of the disc D. By this, a light amount advancing into the disc D can be increased.

Therefore, in the disc drive of this embodiment, too, the position of the opening 3 is made clear by the light from the light source 30 leaking out of the opening 3 before the disc D is inserted into the opening 3, the user can insert the disc D in the opening 3 easily even in a dark place. Also, since the disc D emits light with high brightness at insertion of the disc D into the opening 3 or ejection of the disc D from the opening 3, the disc drive exerts the excellent illumination effect. When the disc D is to be ejected from the opening 3, since visibility of the disc D is improved, the user can easily withdraw the disc D.

The disc drive in the first to the third embodiments can be applied to a CD player, DVD player, DVD recorder, DVD player for car navigation or the like. Also, the disc drive in the first to the third embodiments is suitable as an on-board disc drive for vehicles and also suitable as an indoor stationary type or portable disc drive other than on-board ones for vehicles.

What is claimed is:

1. A slot-in type disc drive configured to drive a disc, comprising:
    an enclosure in which an opening for insertion and ejection of the disc is formed;
    a disc carrying unit provided inside the enclosure, located inside the enclosure at all times without appearing outside the enclosure, having a pair of members for holding the disc therebetween, and configured to carry the disc having been inserted into the opening to an inside of the enclosure by holding the disc between the members and eject the disc having been carried into the inside of the enclosure from the opening;
    a moving member provided inside the enclosure, located inside the enclosure at all times without appearing outside the enclosure, and configured to have a disc contact portion in contact with an end face of the disc and move the disc contact portion in the state where the disc contact portion is in contact with the end face of the disc when the disc carrying unit carries the disc; and
    a light source provided at the disc contact portion and configured to have light enter the inside of the disc from the end face of the disc.

2. The disc drive according to claim 1, wherein the moving member is a rotating member configured to rotate around a predetermined position when the disc carrying unit carries the disc.

3. The disc drive according to claim 1, further comprising a locking unit configured to separate the disc contact portion from the end face of the disc and lock the moving member at a separate portion when the disc is carried to a carrying completion position inside the enclosure by the disc carrying unit.

4. The disc drive according to claim 1, wherein the disc contact portion comprises a first disc contact portion and a second disc contact portion provided at positions separated from each other, a first light source is provided at the first disc contact portion; and a second light source is provided at the second disc contact portion, and when the moving member is located at an initial state before the disc is inserted into the opening, an interval between the first light source and the second light source in the direction crossing the disc carrying direction is 15 mm or more.

5. The disc drive according to claim 4, wherein the first light source and the second light source are arranged so that they are located on both sides of the center line of the disc extending along the direction in parallel with the disc carrying direction, and a distance from the center line to the first light source or the second light source in the direction crossing the center line is set within a range from 10 mm to 30 mm.

* * * * *